(No Model.)
D. WARNER.
HOLDBACK FOR VEHICLES.
No. 465,224. Patented Dec. 15, 1891.
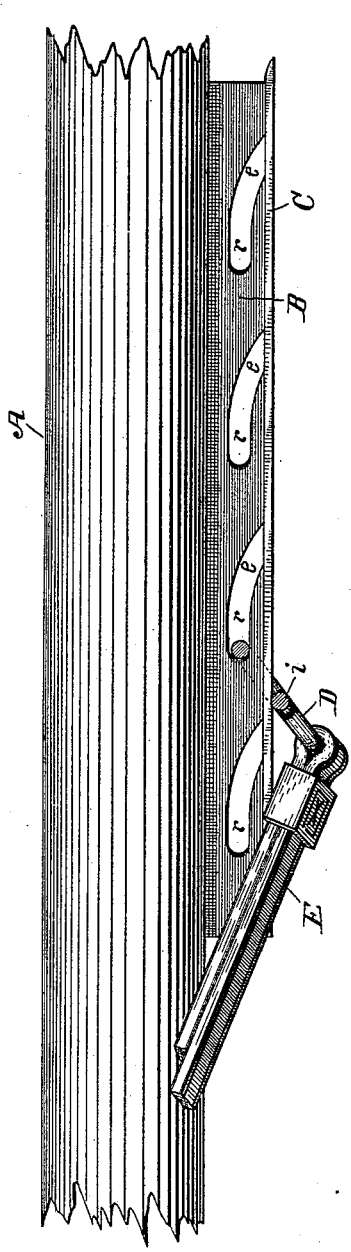
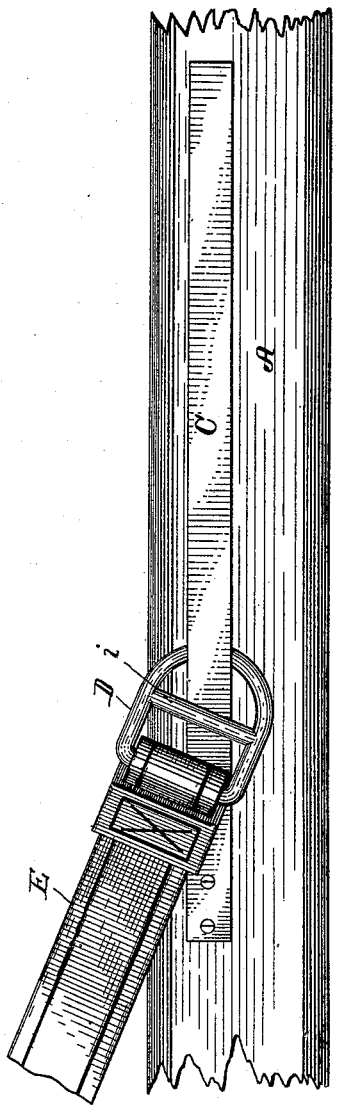
Witnesses:
Walter S. Wood
Franklin Marsh
Inventor.
Daniel Warner
By Lucius C. West
Att'y.

UNITED STATES PATENT OFFICE.

DANIEL WARNER, OF BRONSON, MICHIGAN.

HOLDBACK FOR VEHICLES.

SPECIFICATION forming part of Letters Patent No. 465,224, dated December 15, 1891.

Application filed August 21, 1891. Serial No. 403,361. (No model.)

*To all whom it may concern:*

Be it known that I, DANIEL WARNER, a citizen of the United States, residing at Bronson, county of Branch, State of Michigan, have invented a new and useful Adjustable Thill-Strap Holder, of which the following is a specification.

This invention relates to that class of adjustable thill-strap holders which employ a notched bar on the under side of the thill and from one to the other of which notches the holdback-strap may be adjusted.

The object of the invention consists in certain features, below described and claimed, designed to add to the utility.

In the drawings forming a part of this specification, Figure 1 is a side elevation, and Fig. 2 an inverted plan of Fig. 1.

Referring to the lettered parts of the drawings, A represents a broken thill of a vehicle. To the under side of the thill, at a point where the holdback-strap E is to be attached, is secured a bar provided with a series of open slots $e$, which slots extend from the under side of said bar upward and rearward. On the under side of said bar is an elastic metal bar C, securely attached to said bar B at the rear end and left free at the forward end, so as to close the opening of said slots $e$ and yet admit of being sprung down, so as to attach the holdback-strap E in one of the slots $e$ and adjusted from one to another in accordance with the size of the horse, the conditions of the harness, or the length of the holdback-strap.

The holdback-strap E is the same as is ordinarily used when horses are hitched to one-horse vehicles. One end is attached to the thill and the other to the breeching of the harness, no harness being here shown.

One end of the holdback-strap here shown has attached thereto a link D, said link being provided with a cross-bar $i$, which bar comes in contact with the elastic bar or spring C and holds it in close contact with the slotted bar B and also holds the end of the link, to which the holdback-strap is attached, away from said bar, as clearly shown in Fig. 1. This link may be made in any suitable form. It will be observed that a portion of the lower side of the slots $e$ of the bar B is made straight, as at $r$, and from thence the slot extends forward and downward to the opening of the slot. The object of this straight portion $r$ is to prevent the link from falling down onto the elastic bar C, and thus be liable to get out of place when the holdback-strap slacks.

In the operation the elastic bar C is sprung down and the link D is caught over said bar and passed back into the desired slot $e$. In detaching the link from one slot and attaching it to another the elastic bar C is sprung down and the link is passed out of one slot $e$ into another.

By means of this construction, aside from other advantages, a horse can be quickly detached from the thills without any unbuckling of straps.

Having thus described my invention, what I claim as new, and desire to secure by Letters Patent of the United States, is—

A thill provided with the bar having a series of open slots, the lower side of said slots for a short distance back from their forward end being horizontally straight, the spring-bar closing said slots, in combination with a holdback-strap, and the link attached to said strap, said link being provided with the central cross-bar adapted to clamp against the under side of the spring-bar when the upper end of the link contacts with said straight portion of the notches, substantially as set forth.

In testimony to the foregoing I have subscribed my name in the presence of two witnesses.

DANIEL WARNER.

Witnesses:
CLARK MOSHIER,
C. J. KEYES.